Nov. 27, 1962

C. A. WINSLOW 3,065,854

CENTRIFUGING AND LIQUID-PURIFYING DEVICE

Filed Aug. 10, 1959

INVENTOR.
CHARLES A. WINSLOW
BY
ATTORNEY

Nov. 27, 1962     C. A. WINSLOW     3,065,854
CENTRIFUGING AND LIQUID-PURIFYING DEVICE
Filed Aug. 10, 1959     2 Sheets-Sheet 2
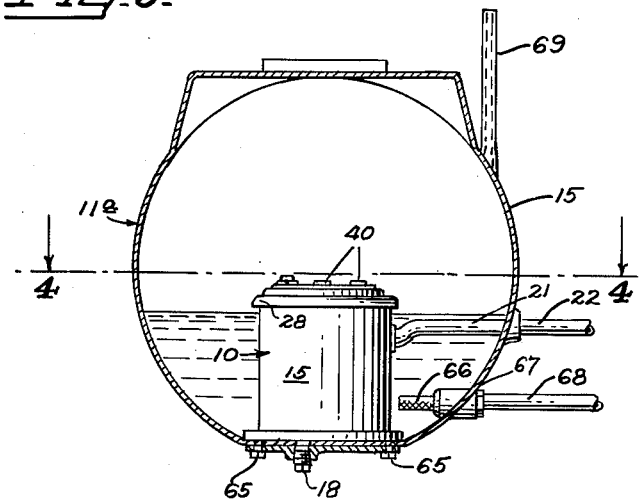
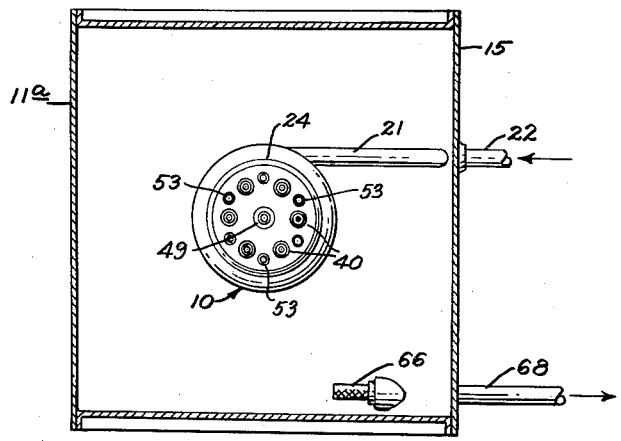
INVENTOR.
CHARLES A. WINSLOW
BY
ATTORNEY.

United States Patent Office 3,065,854
Patented Nov. 27, 1962

3,065,854
CENTRIFUGING AND LIQUID-PURIFYING
DEVICE
Charles A. Winslow, Oakland, Calif. (205 Martinique
Ave., Paradise Cay, Tiburon, Calif.)
Filed Aug. 10, 1959, Ser. No. 832,626
9 Claims. (Cl. 210—130)

This invention relates to centrifuging and liquid-purifying devices and, in particular, it relates to an improved oil or fuel filtering device adaptable for use with aircraft and other types of engine systems.

In dry sump engines, such as aircraft and marine engines, the sump for the lubricating oil is kept dry by a secondary sump pump that constantly pumps at a rate about 50% higher than the rate at which the oil is normally pumped to the engine bearings by the primary oil-pressure pump. As a result, about one third of what is pumped from the sump is air. Air is a very poor engine lubricant and if a foamy oil-air mixture is pumped to the bearings, increased wear results.

Not only is foamy oil injurious to engine components, but the aeration also prevents effective purification of the oil, making it difficult to filter out the harmful impurities such as the heavy particles, acidic corrosives, and minute pieces of metal contained in the foamy oil returned from the engine.

One reason why foamy oil cannot be efficiently filtered is that the alternation of liquid and gas passing through the filter-bed tends to force the collected dirt through the filter. For instance, a constant flow of oil maintained by a relatively constant pressure is filtered not only by a screening process but also by adhesion and cohesion of deleterious material to the filter fibers. This action gradually builds up the density of the filter-bed and can even lead eventually to a condition where the filter-bed becomes clogged with filtered-out material. Alternate slugs of oil and air, or even the disturbing influence of coarse foam in the oil stream, tend to disturb the filtering process by causing collected material to be broken loose and forced through the filter-bed. It is therefore important to eliminate as much as possible of the air and gas from the oil stream before actual filtering takes place.

The principal object of the present invention is to solve the aforementioned problems of filtration and de-aeration which have plaqued the prior art, by providing a unique structure that combines both centrifugal and filtering action to produce an effective means of purifying fluids.

A novel sequence of operations begins by utilizing the centrifugal action in a primary stage, wherein the foamy fluid, entering at the inlet in the form of foam, is separated into air or gas that is released in an upward direction and liquid oil that passes first downward into an inner lower sump and then upward through filtering cartridges.

As the combined liquid and gases enter a tangential inlet and are caused to rotate during their de-aeration, they are brought into close contact with a reactive metallic surface at high velocity, so as to induce and accelerate corrosive action on an expendable metal by any materials of a corrosive nature which may be circulating with the fluids being processed. Thereby, the corrosive materials are removed. For example, acids may be removed from the lubricating system of an internal combustion engine. Preferably, the heavier part of the fluid passes down over the metallic surface, which may be of magnesium alloy or of zinc, for example, and between thin-walled surfaces toward the bottom of the container. The centrifugal downward flow spins outwardly heavy particles such as lead salts, grit, carbon, metal, etc., toward the periphery and the bottom of the container.

Then my new apparatus reverses the downward direction of flow of the oil and sends it inwardly and upwardly through a second inner section, passing it through one or more filter elements which are secured within the inner section of the device. The filtered oil then passes out the upper portion of the filter element outlets, collecting in an annular cavity which overflows into the tank in which the filter is housed.

Another object of my invention is to maintain within the filtering device a constant force which provides a steady flow of fluid through the device and prevents the clogging thereof by filtered-out material. Thus an important feature of the device is its novel combination with a by-pass valve located in the upper section, where only the cleaner portion of the fluids gravitates. This valve governs the pressure limitation between the inlet and the outlet of the apparatus, thus maintaining a constant maximum resistance that will be encountered by the combined influence of the centrifugal force, gravity, filtering, de-aeration, etc.

Another object of the present invention is to provide a filtration device which may be housed in the storage tank for the material being filtered, to provide easy access to the filtration device within the tank and to eliminate the need for special lines from the engine sump to the filter.

Still another object of the invention is to provide a restricted vent means for the air content of the fluid, which not only lets the air go out after its centrifugal separation from the oil, but also acts to build up sufficient back-pressure to insure filtration. If some oil passes out through the vent, the foamy oil is collected on the underside of the top annular drip-ring and runs back into the oil tank. Foamy oil passing through the vent opening merely increases temporarily the back-pressure; the air ultimately clears the vent orifice which discharges to the oil tank which houses the filter.

Another object of the present invention is to provide a filtration device particularly adapted for use on aircraft. Heretofore, aircraft operators have been reluctant to carry oil filters because of the fear that they may reduce the vital circulation of the oil, and because of weight and space limitations. The present invention, as will be seen by the following disclosure, provides not only efficient, reliable oil filtration, but its novel structural features enable it to be installed directly within the aircraft's oil tank, which may be conveniently constructed within the integral wing structure.

Other objects and advantages of the present invention will be apparent from the following description and from the drawings in which:

FIG. 1 is a view in elevation and in section taken through the center of an apparatus embodying the principles of the invention, showing the device installed in an aircraft-wing oil-tank.

FIG. 2 is a plan view taken partially in section along the line 2—2 as shown in FIG. 1. One half of the FIG. 2 shows the top of the filtering device and the other half shows the internal structure of the filter in a horizontal cross-section. Outer portions of the view have been broken off to conserve space.

FIG. 3 is a view in elevation and in section showing diagrammatically the filtering device of the present invention installed in an oil tank.

FIG. 4 is a plan view in section taken along line 4—4 of FIG. 3.

Figures 1, 2:
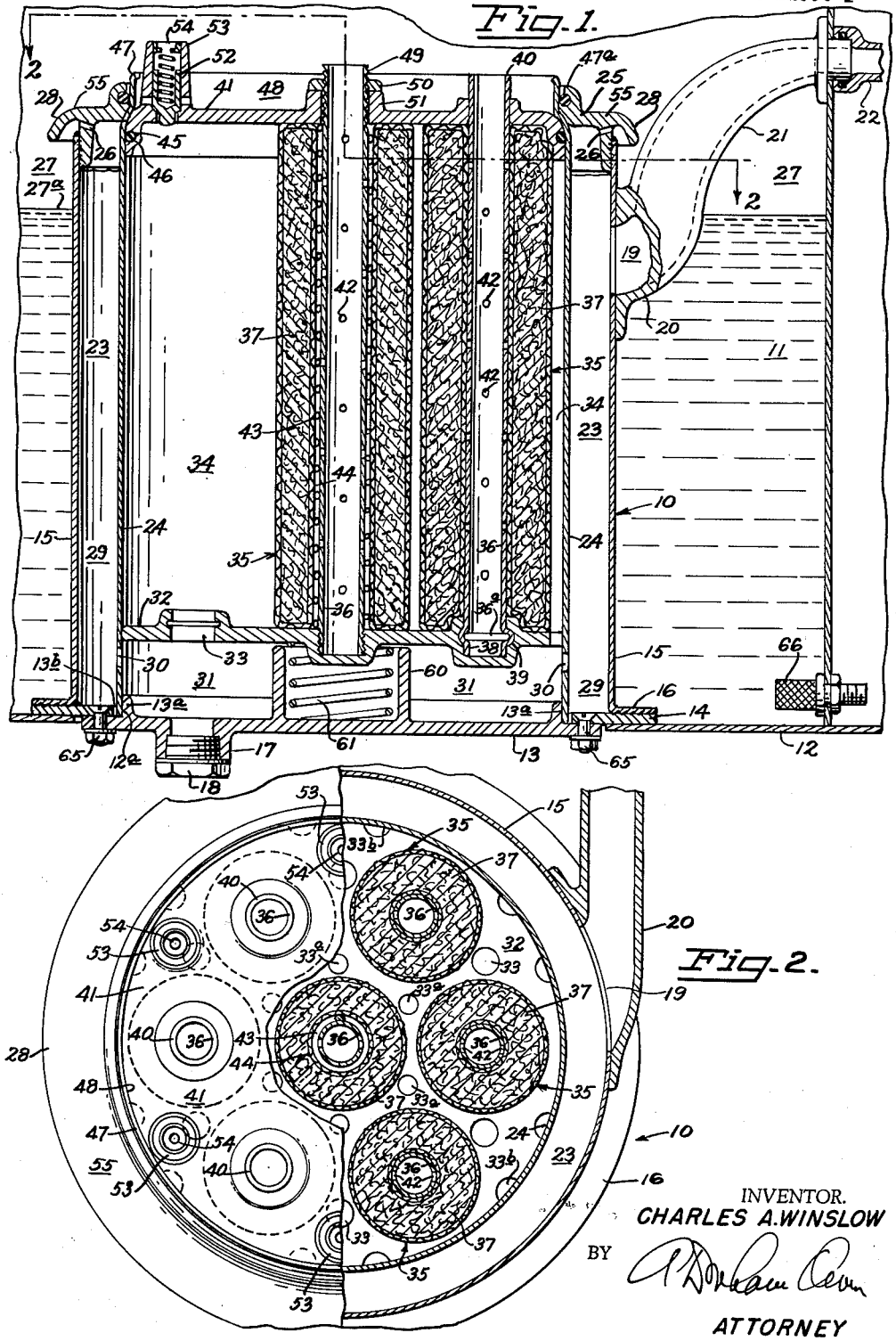

Referring to FIG. 1, the combined filter and centrifuge 10 is shown as it may be installed in an oil tank 11 located in an aircraft wing-section 12. In this particular tank 11, access to the filter 10 from the bottom may be had through an opening 12a in the underside of wing-section 12. The oil purifying apparatus 10 is provided with a bottom coverplate 13 having an annular upturned flange 13a. The coverplate 13 is bolted by cap screws 65 to a ring 14 that is welded to the wing-section 12 forming the bottom of the oil tank 11. Before the ring 14 is inserted, an outer housing 15 is welded to it by means of a flange 16 and the outer housing 15 extends up in a cylindrical form to the upper end of the filter 10. The plate 13 is provided with a drain-fitting 17 having a plug 18 which can be withdrawn at any time without taking the entire plate 13 off to drain out a sump-portion 31 of the filter apparatus 10.

The housing member 15 is provided with a tangential inlet opening 19 by an inlet fitting 20, which is connected by a portion 21 to a conduit 22 leading from the scavenging oil sump pump (not shown) of the engine. Thus the oil and air enter the filter apparatus 10 in a foam through the tangential inlet opening 19 and pass into an annular space 23 provided between the outer wall 15 and an inner wall 24. This wall 24 may be made of easily-corrodible, expendable material to de-acidify the oil, or it may be made of the same material as the housing 15, in cases where such removal of the corrosive agents is of less importance.

The annular space 23 is closed at its upper end by an annular cap-member 25 having a plurality of small air vents 26 around its periphery, as shown. Preferably, the vents 26 lead out onto the foam-space or air-space 27 above the oil level 27a of the oil in the tank 11. The escaping air is deflected down by a deflecting-member 28 which is welded to the housing 15 so that any oil which may go out the vents 26 will simply flow down the outer wall of housing 15 to meet the oil in the tank itself. The air will then go into the upper space 27 above the oil and eventually back to the engine crankcase and to the atmosphere through a crankcase vent (not shown). If desired, the air and gases from the foamy oil mixture may be vented directly to the atmosphere from the tank 10. The oil which passes through the filter 10 is collected in the bottom of the tank 11 and returned to the engine crankcase through an outlet fitting 66 in the wall 67 of the tank 11.

The bottom of the annular space 23 provides a small sump or dirt-space 29 to gather material that can be thrown out from the oil during its centrifugal action or settled by gravity. This space 29 lies below radial openings 30 which provide for the flow of oil through the lower end or near the lower end of the partition 24, but a substantial distance above its lower end. The member 24 is preferably piloted by the circular flange 13a and is removable along with the lower plate 13 for replacement and for removing the solids that have collected in the dirt space 29.

The oil that passes through the openings 30 after the primary centrifugal cleaning enters an annular sump 31 between the wall 24 and a short cylindrical protuberance 60 from which the drain opening 17 leads. The solids are collected in this sump 31. Although they have not been illustrated, magnets may be provided to collect metal filings or deposits and arrest their further passage through the filter 10, by using the principles disclosed in my copending application Serial No. 610,763, filed September 19, 1956. The upper end of the sump 31 is closed by a disc 32 having oil passage openings 33, 33a and 33b, through which the oil may enter into the filtering-portion 34 of the apparatus 10. Thus, it will be seen that, by the time the oil reaches the filtering-portion 34, it has already been (1) de-aerated with the air being vented out the vents 26 and (2) centrifuged free from solids and heavy particles which have been (3) deposited in the dirt-space 29 and sump 31.

In the filter-space 34 are a plurality of filter cartridges 35. Each filter cartridge 35 has a cylindrical outlet-tube 36 which passes through the enclosed filtering material 37 and extends above and below the ends thereof. A coiled wire spring 43 around the tube 36 provides a flow space 44 between the tube 36 and the filtering material 37.

I prefer to form the outlet tubes 36 with a rolled bead 36a at their lower ends 38 so that each tube 36 will seat in a depression 39 in the plate 32. One tube 36 and its filter 37 are centrally located, and preferably threaded into a depression in the plate 32 which rests on a retaining spring 61 within the protuberance 60. The tubes 36 thus are all closed at their lower end by being threaded into or sealed to the plate-disc 32, and their open upper end 40 projects beyond a closure-plate 41. Entry into the tubes 36 is afforded by a series of openings 42, so that oil which passes through the filter cartridges 35 can enter the tubes 36 at these various openings 42 and flow upwardly therethrough under the pressure exerted from the scavenger oil sump pump.

The upper closure-plate 41 is provided with a groove 45 to receive an O-ring 46 to seal between it and the upper end of the cylindrical partition 24. The partition 24 extends up above the bottom of the plate 41 to provide a piloting rim 47, and the oil outlet tubes 36 extend slightly above this rim. Thus, the filtered oil leaves the outlet 40 of the tubes 36 and falls down into the annular space 48 provided by the rim 47. When the oil fills this space 48, it goes up over the rim 47 and down over the curved outer surface 55 of the deflecting member 28 of the cap-member 25 and thence, in the form of clean filtered oil, down the sides of the outer housing 15 into the oil in the tank 11. This affords some further de-aeration, should any air be carried along, although by that time the oil is pretty well freed from air. The center oil cartridge outlet tube 36 may have an upper threaded end 49 on which is threaded a hold-down nut 50 that engages an upwardly projecting turret 51 on the upper closure-plate 41 and holds it down in contact with the cartridge 35 and compresses all the cartridges 35 between the upper closure-plate 41 and the lower plate 32. The internal filter assembly, including the filter elements 35 and upper and lower plates 41 and 32, is supported on the compression spring 61. As the tubes 36 are all a free fit in top plate 41, they will move upwardly easily due to spring 61 which thus assures a uniform compression on the filter elements 35 between the plates 32 and 41 and also a seal on O-rings 46 and 47a.

The removal of the filter assembly, comprising elements 13, 41, and 24 as shown in FIG. 1, may be performed simply by removal of the retaining cap-screws 65 and coverplate 13. The coverplate 13, upper plate 41, and cylindrical member 24 form a removable assembly piloted by flange 47, sealed by O-ring 47a, and may be removed as a unit for servicing. The filter assembly is retained in position by the flanged inner surface of ring 28, which is preferably welded to the shell 15. The nut 50 affords some adjustment in controlling the distance between upper and lower plates 41 and 32 so as to firmly hold the filter cartridges 35. When shrinkage of the cartridges 35 occurs, the spring 61 supplies follow-up compression to maintain the snug grip on the cartridges.

The upper closure-plate 41 is also provided with a plurality of by-pass valves 52. For this purpose, the plate 41 may have short annular protuberances 53 that extend up above the outlet of the tubes 36 and provide a cylindrical passage 54 that contains the by-pass valve 52. The by-pass valve 52 is of the spring-urged type which will open when a predetermined pressure is reached. The actual structure of these by-passes 52 is not so important, but their location and function are. The location insures that, first, any trapped air and, second, only the cleanest oil in this filter is by-passed. The clean oil is by-passed after it has been purged of air and has been centrifuged, freeing it of solids that are heavy enough to remain in the sump. Yet this by-pass is free from major obstructions, so that it will always function.

In operation, my filter is adapted for installation within an oil tank 11 which, as shown in FIG. 1, may be conveniently located within wing-structure 12 of an aircraft or, also, in the lubrication-oil tank of any suitable engine system such as an industrial engine, a marine engine, and a locomotive engine. Oil in its foamy, dirty state from the crankcase of the engines is scavenged and pumped through the conduit 22 into the tangential inlet 19 on the filter housing-member 15. The tangential inlet 19 provides a passage for the oil into the annular space 23, where the oil travels in a circular path which centrifugally separates out heavy particles that settle in a dirt-space 29. The oil then flows into an annular sump 31 wherein solid particles are further collected by gravity before the oil continues upward through openings 33, 33a, 33b into the filtering portion 34 of the apparatus. The oil then passes through the filter-cartridges 35 and enters the outlet-tubes 36 thereof through openings 42. The clean, filtered oil rises in the outlet tubes 36 and overflows first into the annular space 48 formed by the top of the inner cylindrical shell 24 of the device. As the space 48 fills and overflows, the oil then passes down over the novel awning-like annular deflecting-ring 28 and proceeds downward to combine with the oil already in the tank 11. A screen oil outlet 66 is fixed near the bottom of tank 11 to recirculate the clean oil back to the engine.

The aforementioned deflecting-ring 28 cooperates in a novel manner within the cylindrical wall 24 and provides several useful and unobvious results comprising an important part of this invention. For example, the curved, awning-like upper surface of the ring 28 diverts the filtered oil away from vents 26, so that it is not blown about as it drips downwardly from the rim 47. Also, the curved inner portion of the ring 28 provides an arresting surface which deflects downwardly any foamy oil which may be blown out vents 26 with air. Thus, the ring 28 permits the unobstructed venting of air from within the filter, but reduces any undesirable effects therefrom while also deflecting downwardly all the oil which comes in contact with the ring.

A typical installation arrangement of my novel filter and de-aerator is more clearly shown in FIGS. 3 and 4, and illustrates some of the installation advantages of the present invention. The filter unit 10 is shown mounted within an oil tank 11a with the outside housing 15 connected to the inlet conduit 22, which is connected at its other end to an engine-oil scavenging pump (not shown). The internal filter assembly 24 is conveniently removable from the lower side of the tank 11a by simply removing the cap-screws 65. The clean oil is returned to the engine through the outlet 66 at the bottom of the tank 11a and is connected to a conduit 68 having a pressure-return pump (not shown). A vent 69 extends from the top of the oil tank to return the excess air and gases, preferably to the engine crankcase. Note, here, that my novel filter device affords an installation wherein no fluid lines or conduits are used to connect directly to the actual filter device. Only the inlet conduit 22 connects to the means for holding the filter in position on the housing 15. This unique feature greatly facilitates the ease of servicing, as well as the initial cost of filter installation.

From the foregoing it will be seen that the present invention has important advantages over anything now in the field and, again, its operation results in a sequence of ordered and carefully arranged functions, each of which is improved in its functioning by its position in the sequence.

An important advantage of my invention are the features which make it highly adaptable for installation in aircraft. For example, in previous filters built into aircraft wing sections, the filter had to be serviced from the top of the wing, which required special handling facilities. In the case of the present invention, however, the filter can be completely serviced from below the wing without draining the oil tank or removing any piping connections whatsoever or having the service personnel climbing over or on top of the wings.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting. For instance, when the filter is used with other than piston engines, it may be desirable to restrict, modify, or close the air-venting features. The device may also be used as a fuel filter and this may be accomplished in one manner by changing the top air-venting feature to a water-venting feature in the bottom of the tank.

I claim:

1. A filter and de-aerator, comprising a fully enclosed liquid-retaining tank having a bottom wall with a circular opening therethrough, said tank also having an inlet opening for unfiltered liquid, a liquid outlet, and an air outlet above the normal level of the liquid in the tank; a housing assembly permanently secured to said bottom wall around said opening with a cylindrical imperforate housing extending up above said normal level, said housing having a tangential inlet fitting and also having air outlet means above said normal level and a top ring extending radially inwardly from the upper end of said housing; conduit means extending into said tank through said inlet opening and connected to said inlet fitting; and a removable filter assembly, comprising a bottom plate removably secured to said tank and closing said opening through said bottom wall, a cylindrical shell secured to said plate and extending up therefrom and, when installed, spaced radially inwardly from said housing and joined to it at said upper end by said top ring, said shell having opening means therethrough adjacent its lower end and being otherwise imperforate, filter means supported within and spaced from said shell and above said bottom plate, and top closure means at substantially the upper end of said shell and closing said shell above said filter means, said filter means having outlet means extending up through said top closure means, whereby said plate can be removed downwardly from said bottom wall without disconnecting any conduits and then carries with it said shell, filter means, and top closure means without disturbing the liquid level in said tank.

2. The device of claim 1 having lip means extending around and above said top closure means and forming an overflow sump on top of said filter assembly.

3. The device of claim 1 wherein said top ring has a series of overhanging awning-like portions extending out over each of said air outlet means, so that liquid flowing over said ring and housing down into said tank does not block said air outlet means.

4. A filter and de-aerator for installation on the bottom of a fully enclosed liquid-retaining tank having a bottom wall with a circular opening therethrough, an inlet opening for unfiltered liquid, conduit means extending into said tank through said inlet opening, a liquid outlet, and an air outlet above the normal level of the liquid in the tank; comprising a housing assembly adapted to be permanently secured to said bottom wall around said opening with a cylindrical imperforate housing extending up above said normal level, said housing having a tangential inlet fitting to which said conduit means is connected and also having air outlet means above said normal level and a top ring extending radially inwardly from the upper end of said housing; and a removable filter assembly, comprising a bottom plate adapted to be removably secured to said tank and closing said opening through said bottom wall, a cylindrical shell secured to said plate and extending up therefrom and, when installed, spaced radially inwardly from said housing and joined to it at said upper end by said top ring, said shell having opening means therethrough adjacent its lower end and being otherwise imperforate, filter means supported within and spaced from said shell and above said bottom plate, and top closure means at substantially the upper end of said shell and closing said shell above said filter means, said filter means having outlet means extending up through said top closure means, whereby said plate can be removed downwardly from said bottom wall without disconnecting any conduits and then carries with it said shell, filter means, and top closure means without disturbing the liquid level in said tank.

5. The device of claim 4 wherein said removable filter assembly includes a perforate support plate supported by and above said bottom plate, said filter means comprising a plurality of filter cartridges supported by and above said support plate.

6. The device of claim 4 wherein said cylindrical shell is made from acid-corrodible metal so as to neutralize acids in the liquid, said shell being in the path of the liquid entering said inlet fitting and whirling around in the space between said shell and said housing on its way to said opening means of said shell, so that said liquid is afforded opportunity for every part of said liquid to come into contact with said shell.

7. The device of claim 4 wherein said top ring has a series of overhanging awning-like portions extending out over each of said air outlet means, so that liquid flowing over said ring and housing down into said tank does not block said air-outlet means.

8. The device of claim 4 having lip means extending around and above said top closure means and forming an overflow sump on top of said filter assembly.

9. The device of claim 8 wherein pressure-sensitive by-pass means is provided between said inlet fitting and said overflow sump for sending liquid to said overflow sump without passing through said filter means, when a predetermined pressure is attained in said housing.

References Cited in the file of this patent
UNITED STATES PATENTS

| | | |
|---|---|---|
| 2,057,779 | Jacobs | Oct. 20, 1936 |
| 2,156,329 | Beck | May 2, 1939 |
| 2,295,097 | Waugh | Sept. 8, 1942 |
| 2,300,381 | Hardy | Oct. 27, 1942 |
| 2,545,374 | Nugent | Mar. 31, 1951 |
| 2,751,084 | Wilhelm | June 19, 1956 |
| 2,811,218 | Winslow | Oct. 29, 1957 |
| 2,877,899 | Hutchins | Mar. 17, 1959 |